United States Patent [19]

Shimizu

[11] Patent Number: 5,398,953
[45] Date of Patent: Mar. 21, 1995

[54] ELECTRICALLY OPERATED POWER STEERING SYSTEM

[75] Inventor: Yasuo Shimizu, Tochigi, Japan

[73] Assignee: Honda Giken Kogyo Kabushiki Kaisha, Tokyo, Japan

[21] Appl. No.: 103,300

[22] Filed: Aug. 9, 1993

[30] Foreign Application Priority Data

Aug. 11, 1992 [JP] Japan .................................. 4-235347

[51] Int. Cl.$^6$ ............................................. B62D 5/04
[52] U.S. Cl. ................................ 180/79.1; 364/424.05
[58] Field of Search ............................ 180/79.1, 142; 364/424.05

[56] References Cited

U.S. PATENT DOCUMENTS

| | | |
|---|---|---|
| 4,657,103 | 4/1987 | Shimizu . |
| 4,681,183 | 7/1987 | Oshita . |
| 5,083,627 | 1/1992 | Kawamoto et al. ............. 180/79.1 |
| 5,247,441 | 9/1993 | Serizawa et al. ............... 180/79.1 |

Primary Examiner—Margaret A. Focarino
Assistant Examiner—Victor E. Johnson
Attorney, Agent, or Firm—Armstrong, Westerman, Hattori, McLeland & Naughton

[57] ABSTRACT

An electrically operated power steering system on a motor vehicle having steerable road wheels has an electric motor for generating an assistive torque to assist a manual steering torque generated by a steering wheel. The power steering system has a steering torque detector for detecting the manual steering torque and producing a manual steering torque signal, a steering angle detector for detecting a steering angle for the motor vehicle and producing a steering angle signal, a target steering torque signal generator for generating a target steering torque signal based on the steering angle signal, and a motor drive signal generator for generating a motor drive signal to be supplied to the electric motor based on the difference between the target steering torque signal and the manual steering torque signal.

6 Claims, 3 Drawing Sheets

ELECTRICALLY OPERATED POWER STEERING SYSTEM

BACKGROUND OF THE INVENTION

1. Field of the Invention:

The present invention relates to an electrically operated power steering system having an electric motor for producing assistive forces to assist manual steering forces in steering a motor vehicle.

2. Description of the Prior Art:

There have heretofore been known electrically operated power steering systems for controlling an assistive torque supplied from an electric motor based on a manual steering torque that has been detected by a steering torque detector. Examples of such electrically operated power steering systems are disclosed in U.S. Pat. Nos. 4,657,103 and 4,681,183.

However, since the conventional electrically operated power steering systems control the assistive torque based on the detected manual steering torque, it has been difficult for the power steering systems to take into account various factors that impair the driver's feel as to steering responses, i.e., the inertia of the electric motor and the friction of the power steering mechanism.

Another problem with the conventional electrically operated power steering systems is that forces tending to return the steering wheel are weak in the vicinity of the neutral position of the steering wheel because the self-aligning torque of the tires is small. Therefore, when the steering wheel is in the vicinity of the neutral position, the steering wheel is apt to be forcibly turned by road surface irregularities or undulations.

SUMMARY OF THE INVENTION

It is therefore an object of the present invention to provide an electrically operated power steering system which prevents a steering wheel from being forcibly turned by road surface irregularities or undulations.

According to the present invention, there is provided an electrically operated power steering system on a motor vehicle having steerable road wheels, comprising manual steering force generating means for generating a manual steering torque, an electric motor for generating an assistive torque to assist the manual steering torque generated by the manual steering force generating means, steering torque detecting means for detecting the manual steering torque generated by the manual steering force generating means and producing a manual steering torque signal indicative of the detected manual steering torque, steering angle detecting means for detecting a steering angle for the motor vehicle and producing a steering angle signal indicative of the detected steering angle, target steering torque signal generating means for generating a target steering torque signal representing a target steering torque based on the steering angle signal produced by the steering angle detecting means, and motor drive signal generating means for generating a motor drive signal to be supplied to the electric motor based on the difference between the target steering torque signal and the manual steering torque signal.

A target steering torque is determined based on a steering angle detected by the steering angle detecting means, and a motor drive signal is supplied to the electric motor based on the difference between the determined target steering torque and a manual steering torque that has been detected by the steering torque detecting means. Therefore, the target steering torque and the manual steering torque are substantially equalized to each other. Since the detected manual steering torque contains a torque component corresponding to the motor inertia and a torque component corresponding to the friction of the power steering system, the power steering system can give the driver of the automobile a natural steering feel without relying upon a complex control process.

For example, when the friction is increased due to an increase in the viscosity of the grease at low temperature, the value of such a friction increase is detected as being contained in the detected manual steering torque, and the motor drive signal is increased to reduce the steering force required to steer the automobile.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
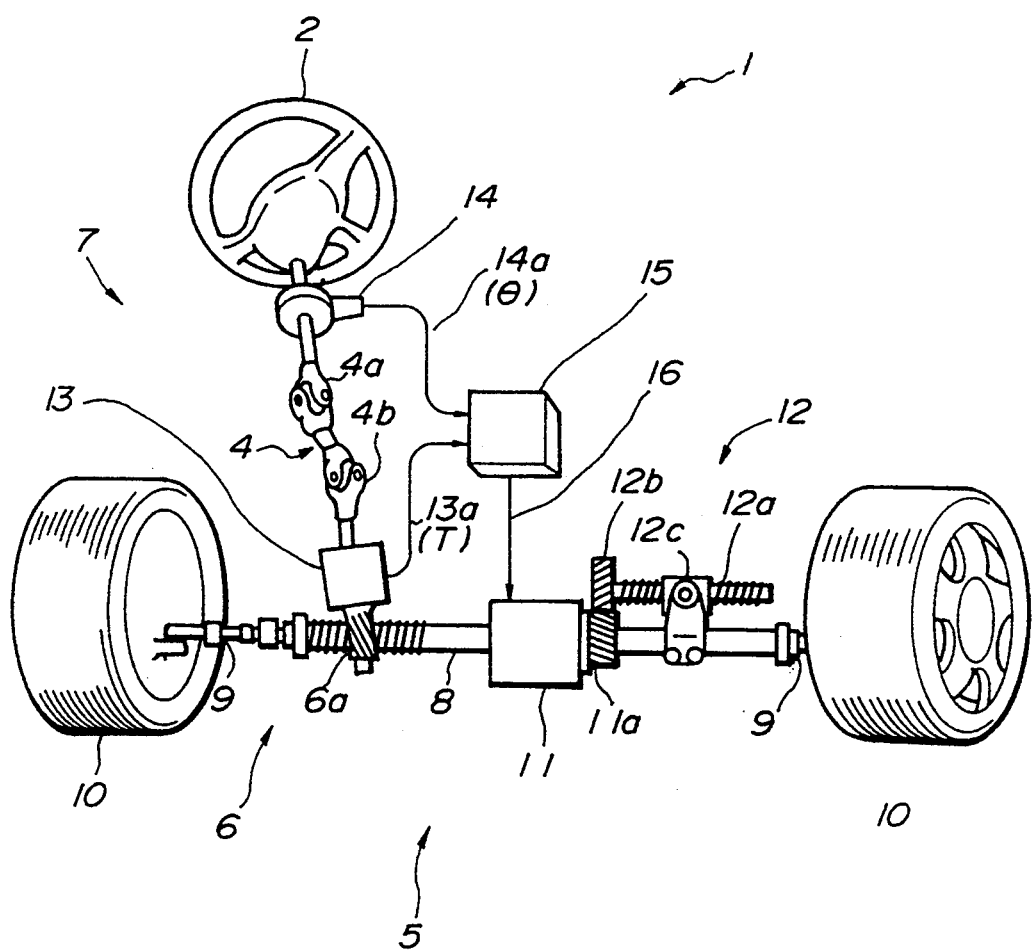
FIG. 1 is a perspective view of an electrically operated power steering system according to the present invention.

As shown in FIG. 1, an electrically operated power steering system according to the present invention, generally designated by the reference numeral 1, is used on an automobile, for example, and includes a steering shaft 3 having one end connected to a steering wheel 2 and the other end to a universal joint 4a on one end of a coupling 4. The coupling 4 is connected through another universal joint 4b on its other end to a rack-and-pinion mechanism 6 in a steering gearbox 5. The rack-and-pinion mechanism 6 has a pinion 6a coupled to the universal joint 4b and a horizontal rack shaft 8 having rack teeth held in mesh with the pinion 6a. The steering wheel 2, the steering shaft 3, the coupling 4, and the rack-and-pinion mechanism 6 jointly serve as a manual steering force generating assembly 7.

The rack shaft 8, which is horizontally reciprocally movable in mesh with the pinion 6a, has opposite ends operatively coupled to respective steerable front road wheels 10 through respective tie rods 9. Therefore, the front road wheels 10 can be manually steered by the steering wheel 2 through the rack-and-pinion mechanism 6 in a usual manner.

The electrically operated power steering system 1 includes an electric motor 11 for producing an assistive torque to assist the manual steering force generated by the manual steering force generating assembly 7. The electric motor 11 is mounted coaxially on the rack shaft 8 for applying the assistive torque to the rack 8 through a ball screw mechanism 12 having recirculating balls.

The electric motor 11 has a rotor coupled to a drive helical gear 11a held in mesh with a driven helical gear 12b on one end of a shaft 12a of the ball screw mechanism 12, the shaft 12a extending parallel to the rack shaft 8. The ball screw mechanism 12 has a nut 12c threaded over the shaft 12a and fixed to the rack shaft 8.

The steering gearbox 5 houses a steering torque detector 13 for detecting a manual steering torque T applied by the steering wheel 2 to the pinion 6a. The steering torque detector 13 supplies a detected manual steering torque signal 13a to a controller 15.

A steering angle detector 14 for detecting a steering angle $\theta$ through which the steering wheel 2 is turned is mounted on the steering shaft 3. The steering angle detector 14 supplies a detected steering angle signal 14a to the controller 15.

In response to the supplied signals 13a, 14a, the controller 15 produces and outputs a motor drive signal 16 to control the rotation of the electric motor 11.

Figure 2:
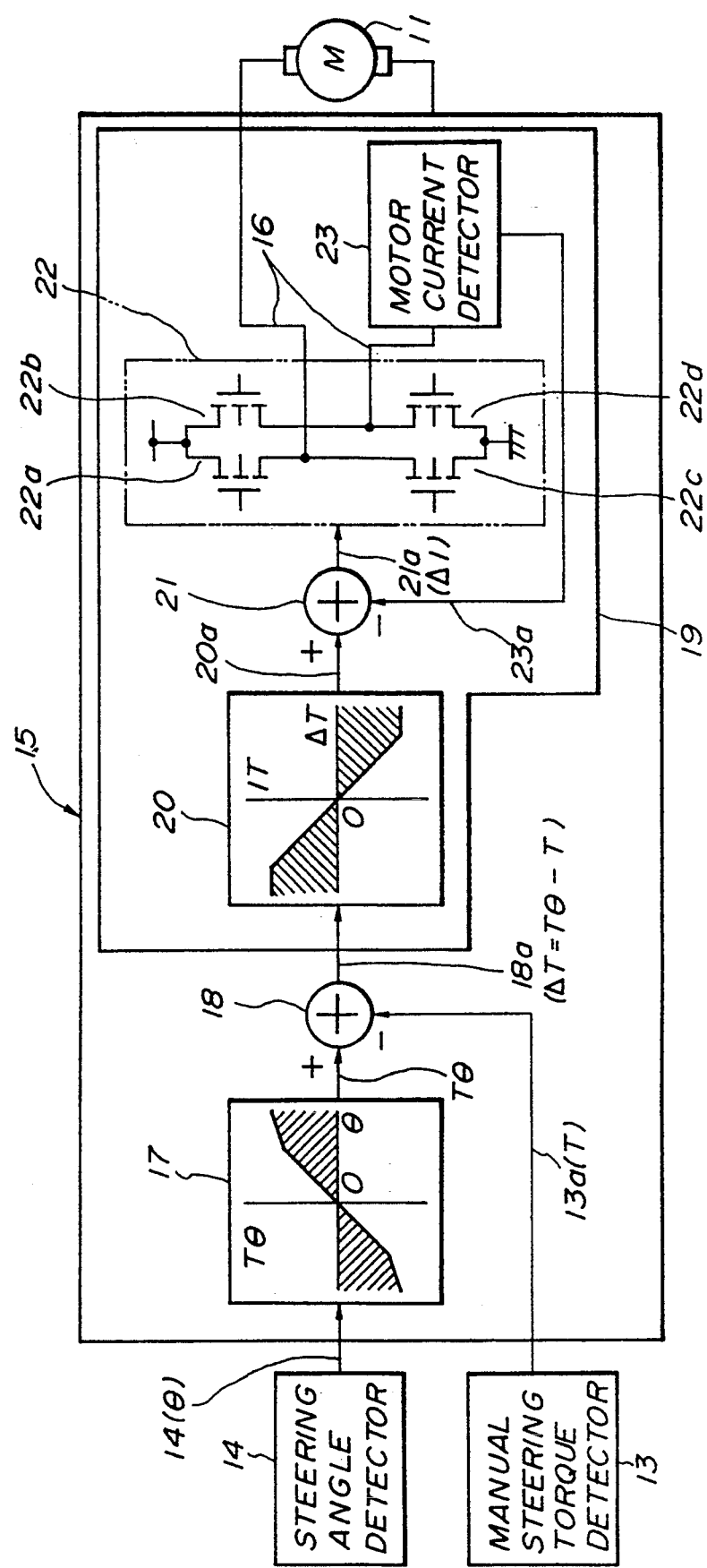
FIG. 2 is a block diagram of an electric control arrangement of the electrically operated power steering system.

As shown in FIG. 2, the controller 15 comprises a target steering torque signal generator 17, a difference calculator 18, and a motor drive signal generator 19.

The target steering torque signal generator 17 generates and outputs a signal indicative of a target steering torque $T\theta$ based on the detected steering angle signal 14a from the steering angle detector 14. The target steering torque signal generator 17 comprises a conversion table stored in a ROM (read-only memory) or the like and containing different target steering torques stored in relation to various steering angles $\theta$. Alternatively, the target steering torque signal generator 17 may comprise a calculating unit for calculating a target steering torque from detected steering angle signal 14a according to a predetermined equation.

As indicated by the graph shown in the block of the target steering torque signal generator 17 in FIG. 2, when the detected steering angle $\theta$ of the steering wheel 2 is in a relatively small range from the neutral position, the target steering torque signal generator 17 produces a target steering torque by multiplying the steering angle $\theta$ by a relatively large coefficient. When the detected steering angle $\theta$ of the steering wheel 2 is greater than a certain threshold, the target steering torque signal generator 17 produces a target steering torque by multiplying the steering angle $\theta$ by a relatively small coefficient.

The steering angle $\theta$ of the steering wheel 2 is proportional to the angle through which the road wheels 10 are steered. When the automobile is put into a garage, the steering wheel 2 is usually turned through a large angle, possibly from lock to lock in three or four revolutions through an angle ranging from 1080 to 1440 degrees. When the automobile is running at 80 km/hour, for example, the steering wheel 2 is turned through an angle range up to 60 degrees. The data in the conversion table of the target steering torque signal generator 17 are selected such that it produces a target steering torque proportional at a higher rate to the steering angle $\theta$ when the steering angle $\theta$ is relatively small, such as when the automobile is running at speed, and it produces a target steering torque proportional at a lower rate to the steering angle $\theta$ when the steering angle $\theta$ is relatively large, such as when the automobile is steered into a garage.

The difference calculator 18 calculates a difference or error $\Delta T$ ($\Delta T = T\theta - T$) between the signal indicative of the target steering torque $T\theta$ from the target steering torque signal generator 17 and the detected steering torque signal 13a indicative of the manual steering torque T from the steering torque detector 13, and outputs an error signal 18a representing the difference or error $\Delta T$.

The motor drive signal generator 19 comprises a motor current setting unit 20, a subtractor 21, a motor current supply circuit 22 composed of a bridge of four power semiconductors 22a, 22b, 22c, 22d, and a motor current detector 23 for detecting the magnitude and polarity of a current actually supplied to the motor 11.

The motor current setting unit 20 produces and outputs a target motor current signal 20a indicative of the polarity and target value of a current to be supplied to the motor 11 based on the error signal 18a from the difference calculator 18. The motor current setting unit 20 comprises a conversion table stored in a ROM or the like and containing different target motor currents IT stored in relation to various differences or errors $\Delta T$. When the error $\Delta T$ is of a positive value, the motor current setting unit 20 outputs a target motor current signal 20a to supply a current of negative polarity to the motor 11. When the error $\Delta T$ is of a negative value, the motor current setting unit 20 outputs a target motor current signal 20a to supply a current of positive polarity to the motor 11. The target motor current IT is proportional to the error $\Delta T$ insofar as the error $\Delta T$ is smaller than a preset threshold. Beyond the preset threshold, however, the target motor current IT remains lower than a predetermined level.

The motor current setting unit 20 may comprise a calculating unit for calculating a target motor current IT from the error $\Delta T$ according to a predetermined equation.

The subtractor 21 produces a difference or error $\Delta I$ between the target motor current signal 20a from the motor current setting unit 20 and a detected motor current signal 23a from the motor current detector 23, and outputs an error signal 21a representing the produced error $\Delta I$.

Based on the error signal 21a from the subtractor 21, the motor current supply circuit 22 controls energization of the power semiconductors 22a>22d according to a predetermined process thereby to control the polarity and magnitude of a current to be supplied to the motor 11.

Operation of the electrically operated power steering system will be described below.

When the driver of the automobile turns the steering wheel 2, the steering angle detector 14 detects a steering angle $\theta$ through which the steering wheel 2 is turned, and outputs a detected steering angle signal 14a to the target steering torque signal generator 17. The target steering torque signal generator 17 produces and outputs a target steering torque $T\theta$ corresponding to the steering angle $\theta$.

The difference calculator 18 then calculates a difference or error $\Delta T$ between the target steering torque $T\theta$ and a manual steering torque T detected by the manual steering torque detector 13 and represented by a manual steering torque signal 13a. The difference calculator 18 supplies an error signal 18a representing the calculated difference or error $\Delta T$ to the motor current setting unit 20. The motor current setting unit 20 outputs a target motor current signal 20a corresponding to the error signal 18a to the subtractor 21, which determines a difference or error $\Delta I$ between the target motor current signal 20a and a detected motor current signal 23a from the motor current detector 23. The subtractor 21 applies an error signal 21a representing the produced error $\Delta I$ to the motor current supply circuit 22, which then energizes the power semiconductors 22a~22d to control the polarity and magnitude of a current to be supplied to the motor 11.

Since the target steering torque $T\theta$ is determined on the basis of the detected steering angle $\theta$, if the steering angle 2 is forcibly turned by the front road wheels 10 due to road surface irregularities or undulations, then the steering angle $\theta$ detected by the steering angle detector 14 is reduced, resulting in a reduction in the target steering torque. As a consequence, the electrically operated power steering system can control the power-assisted steering operation of the automobile with greater toughness or resistance against disturbances induced by road surface irregularities or undulations, for example.

The above control process will be described in detail based on equations given below.

First, it will be confirmed that the target steering torque $T\theta$ and the manual steering torque T are brought into substantial conformity with each other by the system shown in FIG. 2.

As shown in FIG. 2, the controller 15 operates to satisfy the following equations (1) and (2):

$$\Delta T = T\theta - T \qquad (1)$$

$$IT = f(\Delta T) \qquad (2)$$

If $f(\Delta T) = k \times \Delta T$, then the equation (2) is rewritten into the following equation (3):

$$IT = k \cdot \Delta T \qquad (3)$$

From the equations (1) and (3) results the following equation (4):

$$IT/k = T\theta - T \qquad (4)$$

If k is of a sufficiently large value, then $IT/k \to 0$, and hence $T\theta$ and T are substantially equal to each other as indicated by the equation (5):

$$T\theta \approx T \qquad (15).$$

For example, if the automobile is in a balanced steered condition with $T\theta = 30$ kg.cm, $k = 100$, $IT = 20$ amperes, then the manual steering torque T is about 29.8 kg.cm from the equation (4). If $k = 1000$, then the manual steering torque T is about 30 kg.cm.

The greater the gradient of the conversion curve in the conversion table of the motor current setting unit 20, i.e., the greater the gain or amplification factor, the more the target steering torque $T\theta$ and the manual steering torque T are brought into conformity with each other.

Generally, the system becomes unstable if the gain is increased. To prevent the system from becoming unstable, the motor current setting unit 20 is in the form of a stored conversion table with its conversion curve being nonlinear or including a dead zone for increased design freedom or flexibility.

The steering torque, indicated by TS, applied by the steering wheel 2 is substantially equal to the steering torque T detected by the steering torque detector 13. Thus, the following equation (6) is satisfied:

$$TS \approx T = TL \pm Tf + TI - TM \qquad (6)$$

where $TS \approx T$: the steering torque;

TL: the torque produced by a load applied from the road to the road wheels;

Tf: the torque produced by the friction of the motor, the gears, and other components associated with the road wheels;

TI: the torque produced by the inertia of the motor and the inertia of the road wheels;

$$TI = \left( I\mu \frac{d^2\theta\mu}{dt^2} \right) \eta$$

where
$I\mu$: the inertia of the motor;
$\theta\mu$: the angular displacement of the motor;
t: time; and
$\eta$: the conversion coefficient; and TM: the torque produced by the motor torque.

Figure 4:
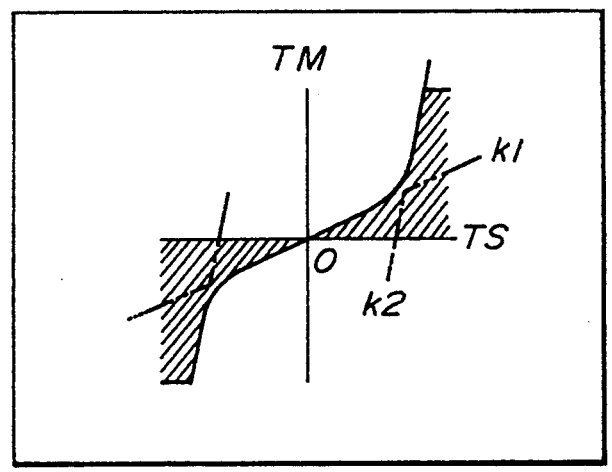
FIG. 4 is a graph illustrative of control characteristics of a conventional power steering system.

A conventional power steering system controls the steering action of an automobile according to the following equation (7) and the characteristic curve shown in FIG. 4:

$$TM = f(TS) \qquad (7).$$

Control characteristics of a conventional power steering system will be described below with reference to FIG. 4. FIG. 4 shows a control characteristic curve of the conventional power steering system, which is approximated by a polygonal line having a gradient k1 and a gradient k2. The gradient k1 is relatively small to make the steering torque proportional to the load from the road surface. The gradient k2 is relatively large to make the steering torque free from the load from the road surface. Normally, the curve portion with the gradient k2 is active only when the automobile is steered while it is at rest, and the curve portion with the gradient k1 is active when the automobile is running.

If the equation (7) is modified into the following equation (8):

$$TM = k1 \cdot TS \qquad (8)$$

then the following equation (9) results from the equation (6):

$$TS \approx T = TL \pm Tf + TI - k1 \cdot TS, \qquad (9)$$

$$\therefore TS \approx T = \frac{TL \pm Tf + TI}{1 + k1}.$$

The equation (9) has the following meaning:

The load TL from the road surface, with a component which corresponds to the gain k1 being deduced therefrom, is transmitted to the steering wheel. At the same time, the friction-induced torque Tf and the inertia-induced torque TI are also transmitted to the steering wheel. In order to increase the steering torque TS to give the driver a direct steering feel, the gain k1 is reduced to 1.0, for example. At this time, a torque equal to half the torques $\pm$ Tf + TI is transmitted to the steering wheel. When the viscous resistance of the motor and the ball screw mechanism is increased due to an increase in the viscosity of the grease at low temperature, the friction torque Tf is increased, and the steering torque TS is increased as indicated by the equation (9). The motor inertia and the road wheel inertia are also transmitted to the steering wheel. As a result, the actual steering characteristics of the automobile become different from intended steering characteristics. Since the inertia torque TI is proportional to the rotational acceleration of the motor and the road wheels, the inertia torque TI is increased when the automobile runs on rough roads or rutted roads.

According to the present invention, inasmuch as the target motor current IT is proportional to the motor torque TM, they are expressed as follows:

$$kM \cdot IT = TM \tag{10}$$

where kM is a proportional constant.

From the equations (4) and (10), $$k \cdot KM(T\theta - T) = TM \tag{11}$$

The equation (11) is substituted into the equation (6) as follows:

$$\begin{aligned} T &= TL \pm Tf + TI - TM \\ &= TL \pm Tf + TI - k \cdot KM(T\theta - T), \end{aligned} \tag{12}$$

$$\therefore T = \frac{TL \pm Tf + TI - k \cdot kM \cdot T\theta}{1 - k \cdot kM}.$$

Since the gain k is sufficiently large as compared with 1, the equation (12) can be approximated by the following equation (13):

$$T = \frac{TL \pm Tf + TI}{-k \cdot kM} + T\theta \approx T\theta. \tag{13}$$

As indicated by the equation (13), the steering torque T has nothing to do with the torques TL, Tf, TI, and is equal to the target steering torque T$\theta$ that is determined based on the detected steering angle. Consequently, the steering torque T is not influenced by the torques TL, Tf, TI even when these torques TL, Tf, TI are varied.

Figure 3:
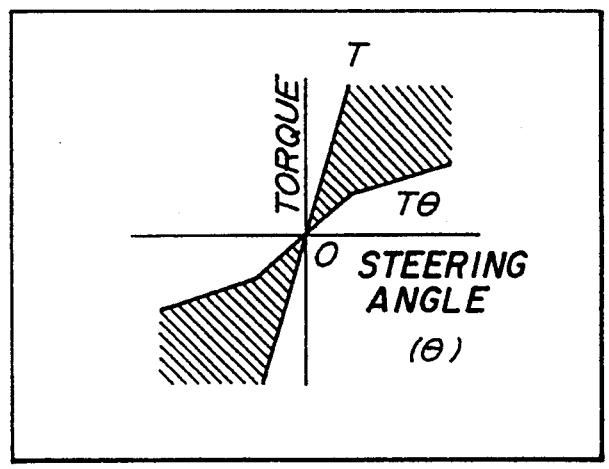
FIG. 3 is a graph showing the assistive torque supplied from an electric motor of the electrically operated power steering system.

FIG. 3 shows the assistive torque which is supplied from the electric motor 11.

If it is assumed that the motor 11 is not energized, then the steering torque varies with the steering angle $\theta$ as indicated by a curve T in FIG. 3. To achieve the steering torque along a curve T$\theta$ in FIG. 3 which corresponds to the target steering torque curve shown in the block of the target steering torque generator 17 in FIG. 2, it is necessary to generate the assistive torque, shown as hatched in FIG. 3, from the motor 11.

When T>T$\theta$, since $\Delta T = T\theta - T < 0$ ($\Delta T$ is negative), the motor drive signal generator 19 supplies a positive current to the motor 11 to reduce the required steering force until the steering torque T becomes equal to the target steering torque T$\Delta$.

When T<T$\theta$, since $\Delta T = T\theta - T > 0$ ($\Delta T$ is positive), the motor drive signal generator 19 supplies a negative current to the motor 11 to increase the required steering force until the steering torque T becomes equal to the target steering torque T$\theta$.

With the present invention, as described above, a target steering torque is determined based on a steering angle detected by the steering angle detector 14, and a motor drive signal is supplied to the motor 11 based on the difference between the determined target steering torque and a manual steering torque that has been detected. Therefore, the target steering torque and the manual steering torque are brought into substantial conformity with each other. Since the detected manual steering torque contains a torque component corresponding to the motor inertia and a torque component corresponding to the friction of the power steering system, the power steering system can give the driver of the automobile a natural steering feel without relying upon a complex control process.

For example, when the friction is increased due to an increase in the viscosity of the grease at low temperature, the value of such a friction increase is detected as being contained in the detected manual steering torque, and the motor drive signal is increased to reduce the steering force required to steer the automobile.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. An electrically operated power steering system on a motor vehicle having steerable road wheels, comprising:

manual steering force generating means for generating a manual steering torque;

an electric motor for generating an assistive torque to assist the manual steering torque generated by said manual steering force generating means;

steering torque detecting means for detecting the manual steering torque generated by said manual steering force generating means and producing a manual steering torque signal indicative of the detected manual steering torque;

steering angle detecting means for detecting a steering angle for the motor vehicle and producing a steering angle signal indicative of the detected steering angle;

target steering torque signal generating means, operably coupled to said steering angle detecting means, for generating a target steering torque signal representing a target steering torque based on the steering angle signal produced by said steering angle detecting means;

calculating means, operably coupled to said target steering torque signal generating means and said steering torque detecting means, for calculating the difference between said target steering torque signal and said manual steering torque signal; and motor drive signal generating means, operably coupled to said calculating means, for generating a motor drive signal to be supplied to said electric motor for driving said electric motor based on the difference between said target steering torque signal and said manual steering torque signal, wherein a direction for determining said target steering torque is the same as a direction of said detected steering angle.

2. An electrically operated power steering system according to claim 1, wherein said manual steering force generating means comprises a steering wheel operatively coupled to said steerable road wheels.

3. An electrically operated power steering system according to claim 1, wherein said target steering torque signal generating means comprises means for multiplying said steering angle by a relatively large coefficient to generate said target steering torque signal when said steering angle is smaller than a predetermined value, and multiplying said steering angle by a relatively small coefficient to generate said target steering torque signal when said steering angle is larger than a predetermined value.

4. An electrically operated power steering system according to claim 1, wherein said target steering torque signal generating means comprises a conversion table containing a first group of target steering torques proportional to respective steering angles at a first gradient and a second group of target steering torques proportional to respective steering angles at a second gradient smaller than said first gradient, and means for selecting one of the target steering torques from said first group in response to said steering angle when the steering angle is smaller than a predetermined value, and selecting one of the target steering torques from said second group in response to said steering angle when the steering angle is larger than a predetermined value.

5. An electrically operated power steering system according to claim 1, wherein said motor drive signal generating means includes motor current setting means for supplying one of: (1) a negative current as said motor drive signal to said electric motor when the difference between said target and manual steering torque signals is of a positive value, and (2) a positive current as said motor drive signal to said electric motor when the difference between said target and manual steering torque signals is of a negative value.

6. An electrically operated power steering system on a motor vehicle having steerable road wheels, comprising:

manual steering force generating means for generating a manual steering torque;

an electric motor for generating an assistive torque to assist the manual steering torque generated by said manual steering force generating means;

steering torque detecting means for detecting the manual steering torque generated by said manual steering force generating means and producing a manual steering torque signal indicative of the detected manual steering torque;

steering angle detecting means for detecting a detected steering angle for the motor vehicle and producing a steering angle signal indicative of the detected steering angle;

target steering torque signal generating means for generating a target steering torque signal representing a target steering torque based on the steering angle signal produced by said steering angle detecting means; and motor drive signal generating means for generating a motor drive signal to be supplied to said electric motor for driving said electric motor based on the difference between said target steering torque signal and said manual steering torque signal, wherein a direction for determining said target steering torque is the same as a direction of said detected steering angle.

* * * * *